United States Patent
Kasuga (10) Patent No.: US 10,862,587 B2
(45) Date of Patent: Dec. 8, 2020

(54) OPTICAL COMMUNICATION SYSTEM, OPTICAL TRANSMITTER MODULE, AND OPTICAL RECEIVER MODULE

(71) Applicant: FANUC CORPORATION, Yamanashi (JP)

(72) Inventor: Ryosuke Kasuga, Yamanashi-ken (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 16/285,529

(22) Filed: Feb. 26, 2019

(65) Prior Publication Data
US 2019/0268073 A1    Aug. 29, 2019

(30) Foreign Application Priority Data

Feb. 27, 2018   (JP) .................................. 2018-033266

(51) Int. Cl.
*H04J 14/00*    (2006.01)
*H04B 10/25*    (2013.01)
(Continued)

(52) U.S. Cl.
CPC ... *H04B 10/25891* (2020.05); *H04B 10/2581* (2013.01); *H04B 10/502* (2013.01);
(Continued)

(58) Field of Classification Search
CPC .. H04B 10/2504; H04B 10/502; H04B 10/60; H04B 10/2581; H04B 10/25891;
(Continued)

(56) References Cited

U.S. PATENT DOCUMENTS 4,373,782 A * 2/1983 Thelen ............... H04B 10/2504
                                                       359/583
4,824,201 A * 4/1989 Kazovsky ........... H04J 14/0226
                                                       359/238
(Continued)

FOREIGN PATENT DOCUMENTS

JP          6410740 A      1/1989
JP       2000114582 A      4/2000
(Continued)

OTHER PUBLICATIONS

English Abstract for Japanese Publication No. 2017034542 A, published Feb. 9, 2017, 2 pgs.
(Continued)

*Primary Examiner* — Dibson J Sanchez
(74) *Attorney, Agent, or Firm* — Fredrikson & Byron, P.A.

(57) ABSTRACT

An optical transmitter module includes: a low-speed light emitting device that emits an optical signal at a first given wavelength; a high-speed light emitting device that emits an optical signal at a second given wavelength; and a first filter that transmits one and reflect the other of the first- and second-given-wavelength optical signals to send the optical signal to an optical receiver module. The optical receiver module includes: a low-speed light receiving device that receives the optical signal at the first given wavelength; a high-speed light receiving device that receives the optical signal at the second given wavelength; and a second filter that transmits one and reflects the other of the first- and second-given-wavelength optical signals to send the first-given-wavelength optical signal to the low-speed light receiving device, and the second-given-wavelength optical signal to the high-speed light receiving device.

2 Claims, 5 Drawing Sheets

US 10,862,587 B2
Page 2

(51) Int. Cl.
*H04B 10/2581* (2013.01)
*H04B 10/60* (2013.01)
*H04B 10/50* (2013.01)
*H04J 14/02* (2006.01)

(52) U.S. Cl.
CPC ............ *H04B 10/60* (2013.01); *H04B 10/50* (2013.01); *H04J 14/00* (2013.01); *H04J 14/026* (2013.01)

(58) Field of Classification Search
CPC ........ H04B 10/50; H04B 10/67; H04B 10/69; H04B 10/506; H04J 14/00; H04J 14/026
USPC .................. 398/43–103, 140–172, 182–214
See application file for complete search history.

(56) References Cited

U.S. PATENT DOCUMENTS

| | | | |
|---|---|---|---|
| 4,973,169 A * | 11/1990 | Slonecker | G02B 6/274 385/1 |
| 5,432,874 A * | 7/1995 | Muraguchi | H04B 10/2503 385/24 |
| 5,661,585 A * | 8/1997 | Feldman | H04B 10/27 359/344 |
| 5,777,764 A * | 7/1998 | Kohn | H04B 10/2931 398/177 |
| 5,844,706 A * | 12/1998 | Kohn | H04B 10/0777 398/181 |
| 6,459,832 B1 * | 10/2002 | Smith | H04J 14/0224 385/1 |
| 6,574,016 B1 * | 6/2003 | Harley | H04J 14/0258 398/79 |
| 6,592,273 B1 * | 7/2003 | Habel | H04B 10/5161 370/487 |
| 7,362,972 B2 * | 4/2008 | Yavor | H04B 10/0775 398/30 |
| 8,346,098 B2 * | 1/2013 | Feng | H04B 10/69 398/202 |
| 8,818,204 B2 * | 8/2014 | Roberts | H04B 10/1143 398/182 |
| 9,628,216 B2 * | 4/2017 | Lyubomirsky | H04J 14/0257 |
| 2003/0025957 A1 * | 2/2003 | Jayakumar | H04B 10/00 398/5 |
| 2003/0231887 A1 * | 12/2003 | Grassi | H04B 10/1127 398/130 |
| 2005/0163177 A1 | 7/2005 | Kawanishi et al. | |
| 2006/0263012 A1 | 11/2006 | Yamazaki | |
| 2006/0269287 A1 * | 11/2006 | Bidmead | H04B 10/0775 398/130 |
| 2008/0050116 A1 * | 2/2008 | Nakaishi | H04J 14/0238 398/43 |
| 2008/0056721 A1 * | 3/2008 | Mori | H04J 3/1617 398/100 |
| 2008/0080857 A1 * | 4/2008 | Goto | H04B 10/07953 398/26 |
| 2008/0231945 A1 * | 9/2008 | Piehler | H04B 10/673 359/337.2 |
| 2009/0067854 A1 * | 3/2009 | Yokogawa | H04B 10/1141 398/202 |
| 2009/0190931 A1 * | 7/2009 | Hamano | H04J 14/0252 398/99 |
| 2009/0196602 A1 * | 8/2009 | Saunders | H04B 10/5053 398/26 |
| 2010/0232798 A1 * | 9/2010 | Kozaki | H04L 7/0338 398/98 |
| 2011/0103792 A1 * | 5/2011 | Kimura | H04B 10/032 398/2 |
| 2011/0142444 A1 * | 6/2011 | Borges | H04Q 11/0067 398/25 |
| 2011/0255875 A1 * | 10/2011 | Mertz | H04B 10/5161 398/183 |
| 2011/0293266 A1 * | 12/2011 | Aoki | H04B 10/516 398/25 |
| 2011/0293283 A1 * | 12/2011 | Dong | H04B 10/693 398/135 |
| 2012/0087661 A1 * | 4/2012 | Look | H04B 10/6161 398/65 |
| 2012/0201541 A1 * | 8/2012 | Patel | H04J 14/0212 398/58 |
| 2012/0251117 A1 * | 10/2012 | Patel | H04J 14/0224 398/79 |
| 2012/0301141 A1 * | 11/2012 | Sakamoto | H04J 14/0204 398/48 |
| 2012/0328296 A1 * | 12/2012 | Sullivan | H04J 14/026 398/79 |
| 2013/0272711 A1 * | 10/2013 | Patel | H04J 14/0257 398/79 |
| 2013/0286847 A1 * | 10/2013 | Schmidt | H04J 14/0276 370/241 |
| 2014/0010543 A1 * | 1/2014 | Lee | H04B 10/61 398/79 |
| 2014/0064721 A1 * | 3/2014 | Wang | H04B 10/038 398/5 |
| 2014/0070752 A1 | 3/2014 | Otsuji et al. | |
| 2014/0139909 A1 * | 5/2014 | Kinoshita | H04B 10/272 359/341.33 |
| 2014/0178071 A1 * | 6/2014 | Zhang | H04B 10/5561 398/65 |
| 2014/0226986 A1 * | 8/2014 | Patel | H04J 14/0224 398/83 |
| 2014/0270776 A1 * | 9/2014 | Jinno | H04J 14/0204 398/69 |
| 2014/0314416 A1 * | 10/2014 | Vassilieva | H04B 3/32 398/76 |
| 2014/0314427 A1 * | 10/2014 | Ojima | H04B 10/6163 398/194 |
| 2015/0043904 A1 * | 2/2015 | Boduch | H04B 10/032 398/2 |
| 2015/0078739 A1 * | 3/2015 | Handelman | H04B 10/032 398/2 |
| 2015/0200790 A1 * | 7/2015 | Lopez Alvarez | H04Q 11/0066 398/45 |
| 2015/0280852 A1 * | 10/2015 | Nakagawa | H04J 14/0258 398/34 |
| 2016/0241353 A1 * | 8/2016 | Wright | H04J 14/0256 |
| 2016/0327746 A1 * | 11/2016 | Mathai | G02B 6/29308 |
| 2017/0041075 A1 | 2/2017 | Nakagawa | |
| 2018/0041278 A1 * | 2/2018 | Funada | H04L 12/287 |

FOREIGN PATENT DOCUMENTS

| | | |
|---|---|---|
| JP | 2000224117 A | 8/2000 |
| JP | 2001160647 A | 6/2001 |
| JP | 2003143085 A | 5/2003 |
| JP | 2005210264 A | 8/2005 |
| JP | 2006271009 A | 10/2006 |
| JP | 2006332800 A | 12/2006 |
| JP | 2009198958 A | 9/2009 |
| JP | 201238312 A | 2/2012 |
| JP | 20166479 A | 1/2016 |
| JP | 201734542 A | 2/2017 |
| JP | 201814351 A | 1/2018 |
| JP | 201818047 A | 2/2018 |
| WO | 2017134911 A1 | 8/2017 |

OTHER PUBLICATIONS

English Abstract for Japanese Publication No. 2012038312 A, published Feb. 23, 2012, 2 pgs.
English Abstract for Japanese Publication No. 2006332800 A, published Dec. 7, 2006, 1 pg.
English Abstract and Machine Translation for Japanese Publication No. 2006-271009 A, published Oct. 5, 2006, 40 pgs.
English Abstract and Machine Translation for Japanese Publication No. 2003-143085 A, published May 16, 2003, 16 pgs.
English Abstract for Japanese Publication No. 2001160647 A, published Jun. 12, 2001, 1 pg.
English Abstract and Machine Translation for Japanese Publication No. 2000-114582 A, published Apr. 21, 2000, 6 pgs.

(56) References Cited

OTHER PUBLICATIONS

English Abstract and Machine Translation for Japanese Publication No. 2016-006479 A, published Jan. 14, 2016, 15 pgs.
English Abstract and Machine Translation for International Publication No. 2017134911 A1, published Aug. 10, 2017, 37 pgs.
English Abstract and Machine Translation for Japanese Publication No. 2018-014351 A, published Jan. 25, 2018, 10 pgs.
English Abstract and Machine Translation for Japanese Publication No. 2009-198958 A, published Sep. 3, 2009, 11 pgs.
English Abstract and Machine Translation for Japanese Publication No. 2018-018047 A, published Feb. 1, 2018, 9 pgs.
English Abstract and Machine Translation for Japanese Publication No. 2000-224117 A, published Aug. 11, 2000, 12 pgs.
English Abstract and Machine Translation for Japanese Publication No. S64-010740 A, published Jan. 13, 1989, 3 pgs.
English Abstract and Machine Translation for Japanese Publication No. 2005-210264 A, published Aug. 4, 2005, 10 pgs.

* cited by examiner

United States Patent 10,862,587 B2

OPTICAL COMMUNICATION SYSTEM, OPTICAL TRANSMITTER MODULE, AND OPTICAL RECEIVER MODULE

CROSS-REFERENCE TO RELATED APPLICATION

This application is based upon and claims the benefit of priority from Japanese Patent Application No. 2018-033266 filed on Feb. 27, 2018, the contents of which are incorporated herein by reference.

BACKGROUND OF THE INVENTION

Field of the Invention

The present invention relates to an optical communication system having an optical transmitter module configured to perform transmission of optical signals and an optical receiver module configured to perform reception of optical signals, an optical transmitter module configured to perform transmission of optical signals, and an optical receiver module configured to perform reception of optical signals.

Description of the Related Art

Japanese Laid-Open Patent Publication No. 2017-034542 discloses an optical communication system having an optical transmitter configured to transmit signal light and an optical receiver configured to receive signal light.

SUMMARY OF THE INVENTION

Since optical modules for low-speed communication and optical modules for high-speed communication have no compatibility, the optical communication system of the technique described in Japanese Laid-Open Patent Publication No. 2017-034542 has the problem that it is unable to perform communication when an optical module for low-speed communication and an optical module for high-speed communication coexist.

The present invention has been made in order to solve the problem above, and an object of the present invention is to provide an optical communication system having compatibility with both of an optical module for low-speed communication and an optical module for high-speed communication, such an optical transmitter module and an optical receiver module.

An optical communication system according to a first aspect of the present invention includes an optical transmitter module for performing transmission of an optical signal and an optical receiver module for performing reception of the optical signal. The optical transmitter module includes: a low-speed light emitting device configured to emit the optical signal at a first given wavelength; a high-speed light emitting device configured to emit the optical signal at a second given wavelength that is a wavelength different from the first given wavelength, and capable of operating at a higher speed than the low-speed light emitting device; and a first filter configured to transmit one of, and reflect the other of, the optical signal at the first given wavelength emitted by the low-speed light emitting device and the optical signal at the second given wavelength emitted by the high-speed light emitting device, so as to transmit the optical signal to the optical receiver module. The optical receiver module includes: a low-speed light receiving device configured to receive the optical signal at the first given wavelength; a high-speed light receiving device configured to receive the optical signal at the second given wavelength and capable of operating at a higher speed than the low-speed light receiving device; and a second filter configured to transmit one of, and reflect the other of, the received optical signal at the first given wavelength and the received optical signal at the second given wavelength, so as to send the optical signal at the first given wavelength to the low-speed light receiving device and send the optical signal at the second given wavelength to the high-speed light receiving device.

An optical transmitter module according to a second aspect of the present invention includes: a low-speed light emitting device configured to emit an optical signal at a first given wavelength; a high-speed light emitting device configured to emit an optical signal at a second given wavelength that is a wavelength different from the first given wavelength, and capable of operating at a higher speed than the low-speed light emitting device; and a first filter configured to transmit one of, and reflect the other of, the optical signal at the first given wavelength emitted by the low-speed light emitting device and the optical signal at the second given wavelength emitted by the high-speed light emitting device, so as to transmit the optical signal to an optical receiver module.

An optical receiver module according to a third aspect of the present invention includes: a low-speed light receiving device configured to receive an optical signal at a first given wavelength; a high-speed light receiving device configured to receive an optical signal at a second given wavelength that is a wavelength different from the first given wavelength, and capable of operating at a higher speed than the low-speed light receiving device; and a second filter configured to transmit one of, and reflect the other of, the received optical signal at the first given wavelength and the received optical signal at the second given wavelength, so as to send the optical signal at the first given wavelength to the low-speed light receiving device and send the optical signal at the second given wavelength to the high-speed light receiving device.

According to the present invention, it is possible to provide compatibility with both of an optical module for low-speed communication and an optical module for high-speed communication.

The above and other objects, features, and advantages of the present invention will become more apparent from the following description when taken in conjunction with the accompanying drawings, in which a preferred embodiment of the present invention is shown by way of illustrative example.

DESCRIPTION OF THE PREFERRED EMBODIMENTS

First Embodiment

Configuration of Optical Communication System

Figure 1A:
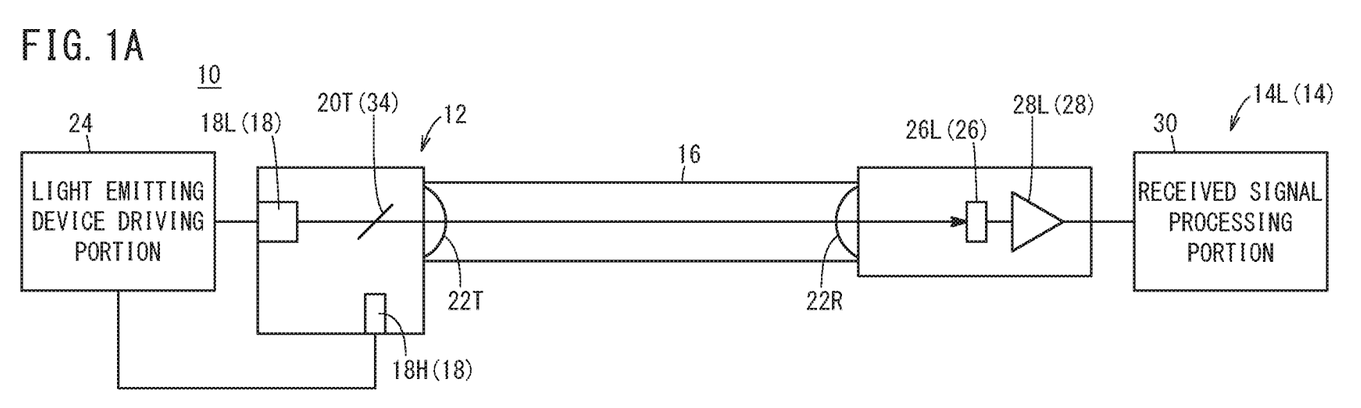
FIGS. 1A and 1B are schematic diagrams each illustrating an optical communication system.
Figure 1B:
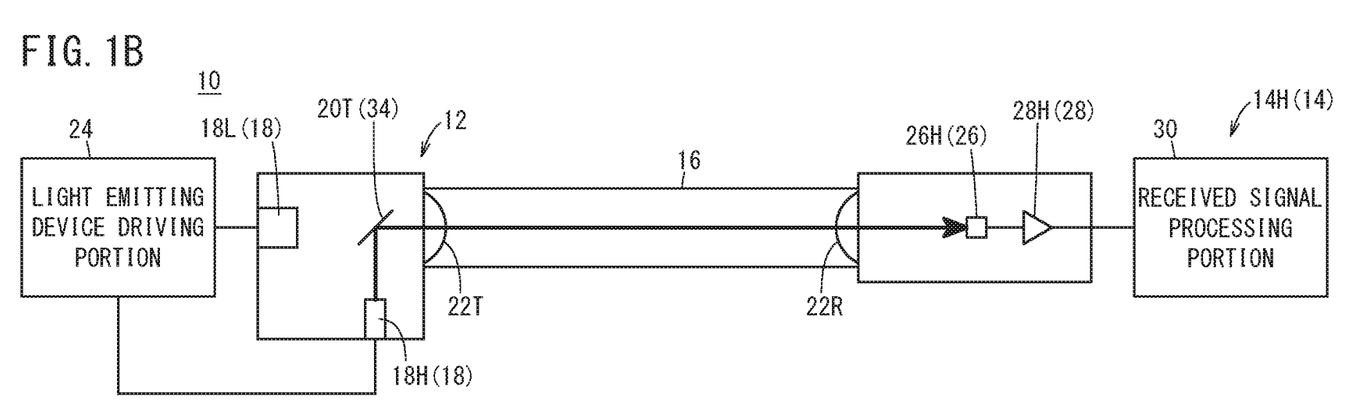

FIGS. 1A and 1B are schematic diagrams each illustrating an optical communication system 10. The optical communication system 10 includes an optical transmitter module 12 and an optical receiver module 14 that are connected through an optical cable 16. An optical signal transmitted from the optical transmitter module 12 is propagated to the optical receiver module 14 through the optical cable 16, and the propagated optical signal is received at the optical receiver module 14.

In the optical communication system 10 of this embodiment, the optical transmitter module 12 is adapted to both of low-speed communication and high-speed communication. On the other hand, the optical receiver module 14 is adapted only to one of low-speed communication and high-speed communication. The optical receiver module 14 of the optical communication system 10 shown in FIG. 1A is an optical receiver module 14 adapted to low-speed communication (which is hereinafter referred to also as a low-speed optical receiver module 14L). The optical receiver module 14 of the optical communication system 10 shown in FIG. 1B is an optical receiver module 14 adapted to high-speed communications (which is hereinafter referred to also as a high-speed optical receiver module 14H).

The optical transmitter module 12 includes a low-speed light emitting device 18L, a high-speed light emitting device 18H, a filter 20T, a lens 22T, and a light emitting device driving portion 24. The low-speed light emitting device 18L is composed of an LED (Light Emitting Diode). The low-speed light emitting device 18L generates an optical signal by flashing on and off light at a wavelength of 650 nm (a first given wavelength). The high-speed light emitting device 18H is composed of an LD (Laser Diode: semiconductor laser). The high-speed light emitting device 18H generates an optical signal by flashing on and off light at a wavelength of 850 nm (a second given wavelength).

The optical signal emitted by the high-speed light emitting device 18H has stronger optical power than the optical signal emitted by the low-speed light emitting device 18L, and the high-speed light emitting device 18H has a higher driving speed than the low-speed light emitting device 18L. The driving speed herein means the rate at which light is flashed on and off.

The filter 20T is a beam splitter, which is configured to transmit the optical signal at the wavelength of 650 nm emitted by the low-speed light emitting device 18L and reflect the optical signal at the wavelength of 850 nm emitted by the high-speed light emitting device 18H. The filter 20T constitutes a first filter 34. The lens 22T causes the optical signal emitted by the low-speed light emitting device 18L, or the optical signal emitted by the high-speed light emitting device 18H, to become parallel light, and outputs the light onto the optical cable 16. The light emitting device driving portion 24 is configured to drive one of the low-speed light emitting device 18L and high-speed light emitting device 18H to make it emit an optical signal based on an instruction from a control device not shown.

The low-speed optical receiver module 14L (FIG. 1A) includes a lens 22R, a low-speed light receiving device 26L, a high-gain amplifier 28L, and a received signal processing portion 30. The lens 22R condenses the optical signal inputted from the optical cable 16. The low-speed light receiving device 26L is composed of a PD (Photo-Diode). The low-speed light receiving device 26L generates a current having a magnitude corresponding to the optical power of the received optical signal. That is to say, the low-speed light receiving device 26L converts the optical signal into a current signal. The high-gain amplifier 28L is configured to convert and amplify the current signal outputted from the low-speed light receiving device 26L into a voltage signal. The received signal processing portion 30 converts the voltage signal amplified at the high-gain amplifier 28L into a digital signal and sends the digital signal to a control device not shown.

The high-speed optical receiver module 14H (FIG. 1B) includes the lens 22R, a high-speed light receiving device 26H, a low-gain amplifier 28H, and the received signal processing portion 30. The lens 22R condenses the optical signal inputted from the optical cable 16. The high-speed light receiving device 26H is composed of a PD. The high-speed light receiving device 26H generates a current having a magnitude corresponding to the optical power of the received optical signal. That is to say, the high-speed light receiving device 26H converts the optical signal into a current signal. The low-gain amplifier 28H is configured to convert and amplify the current signal outputted from the high-speed light receiving device 26H into a voltage signal. The received signal processing portion 30 converts the voltage signal amplified at the low-gain amplifier 28H into a digital signal and sends the digital signal to a control device not shown.

The low-speed light receiving device 26L has a light receiving area formed larger than that of the high-speed light receiving device 26H. The low-speed light receiving device 26L has a larger light receiving area than the high-speed light receiving device 26H, and the low-speed light receiving device 26L has higher sensitivity than the high-speed light receiving device 26H. Further, the high-speed light receiving device 26H has a smaller light receiving area than the low-speed light receiving device 26L, and the high-speed light receiving device 26H has a faster response speed than the low-speed light receiving device 26L.

The light receiving area of the low-speed light receiving device 26L is set in accordance with the optical power and flashing speed of the optical signal emitted by the low-speed light emitting device 18L, and the light receiving area of the high-speed light receiving device 26H is set in accordance with the optical power and flashing speed of the optical signal emitted by the high-speed light emitting device 18H.

The low-gain amplifier 28H of the high-speed optical receiver module 14H has a gain that is set lower than that of the high-gain amplifier 28L of the low-speed optical receiver module 14L. The current signal converted from the optical signal at the high-speed light receiving device 26H of the high-speed optical receiver module 14H has a smaller amplitude than the current signal converted from the optical signal at the low-speed light receiving device 26L of the low-speed optical receiver module 14L. Accordingly, the low-gain amplifier 28H can convert the current signal into a voltage signal and maintain the waveform without saturating the amplified voltage signal.

The light emitting device driving portion 24 of the optical transmitter module 12 is configured to drive the low-speed light emitting device 18L when the optical receiver module 14 connected through the optical cable 16 is the low-speed optical receiver module 14L, and drive the high-speed light emitting device 18H when the optical receiver module 14 connected through the optical cable 16 is the high-speed optical receiver module 14H.

Functions and Effects

Figure 2A:
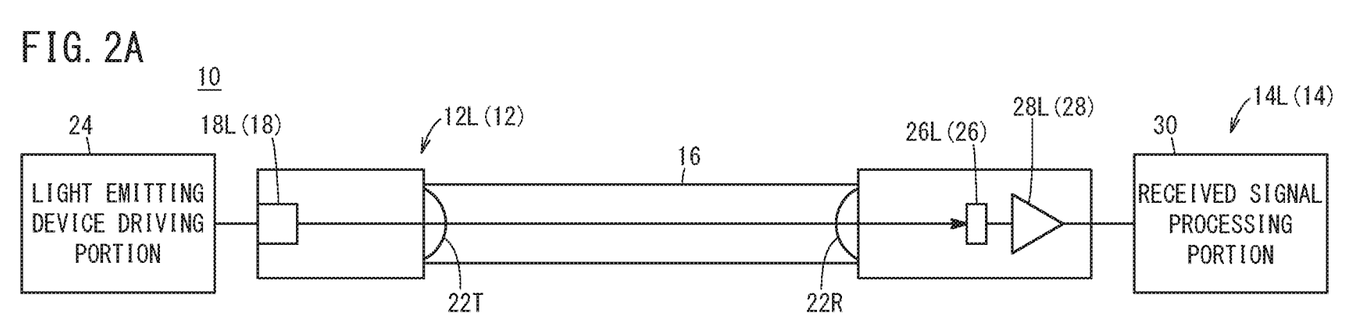
FIG. 2A is a schematic diagram illustrating an optical communication system for low-speed communication.
Figure 2B:
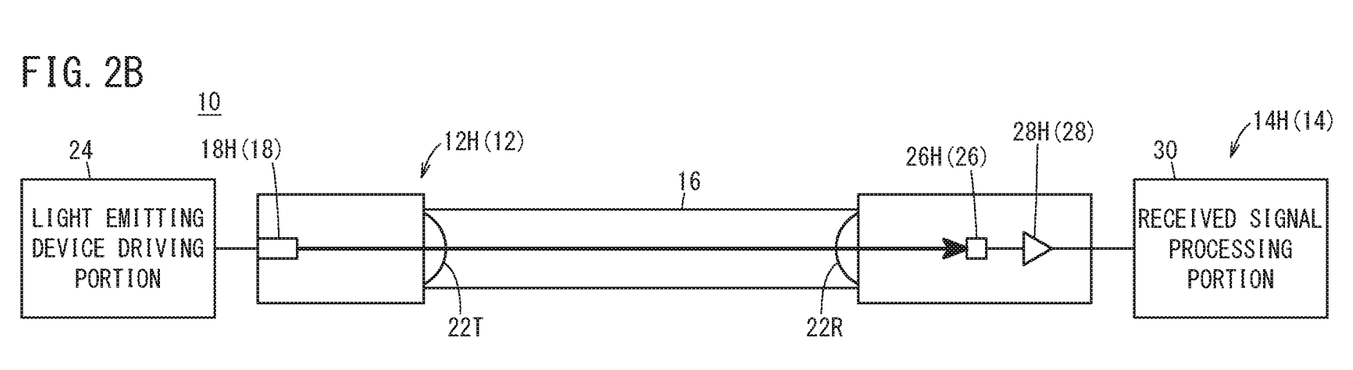
FIG. 2B is a schematic diagram illustrating an optical communication system for high-speed communication.

FIG. 2A is a schematic diagram illustrating an optical communication system 10 for low-speed communication. FIG. 2B is a schematic diagram illustrating an optical communication system 10 for high-speed communication. Systems like the optical communication system 10 for low-speed communication as shown in FIG. 2A have conventionally been employed, but systems like the optical communication system 10 for high-speed communication as shown in FIG. 2B are being in use as the demand for higher-speed communications increases. However, the optical communication system 10 for low-speed communication and the optical communication system 10 for high-speed communication coexist, and the optical communication system 10 for low-speed communication and the optical communication system 10 for high-speed communication do not have compatibility, and hence may fail to conduct communication.

Description will be given below concerning the configurations of the optical communication system 10 for low-speed communication and the optical communication system 10 for high-speed communication, and concerning a reason why the optical communication system 10 for low-speed communication and the optical communication system 10 for high-speed communication have no compatibility.

In the optical communication system 10 for low-speed communication (FIG. 2A), an optical transmitter module 12 adapted to low-speed communication (which is hereinafter referred to also as a low-speed optical transmitter module 12L) and the low-speed optical receiver module 14L are connected through the optical cable 16. The low-speed optical transmitter module 12L includes the low-speed light emitting device 18L made of an LED.

In the optical communication system 10 for high-speed communication (FIG. 2B), an optical transmitter module 12 adapted to high-speed communication (which is hereinafter referred to also as a high-speed optical transmitter module 12H) and the high-speed optical receiver module 14H are connected through the optical cable 16. The high-speed optical transmitter module 12H includes the high-speed light emitting device 18H made of an LD.

The low-speed optical receiver module 14L receives the optical signal emitted by the low-speed light emitting device 18L having smaller optical power than the optical signal emitted by the high-speed light emitting device 18H. In order to enhance the sensitivity to the optical power of the optical signal, the low-speed light receiving device 26L has a larger light receiving area than the high-speed light receiving device 26H.

Further, because the optical signal emitted by the low-speed light emitting device 18L has smaller optical power than the optical signal emitted by the high-speed light emitting device 18H, the magnitude of the current signal converted by the low-speed light receiving device 26L is smaller than that of the current signal converted by the high-speed light receiving device 26H. In order to ensure the magnitude of the voltage signal, the low-speed optical receiver module 14L converts and amplifies the current signal outputted from the low-speed light receiving device 26L into a voltage signal by employing the high-gain amplifier 28L having a higher gain than the low-gain amplifier 28H of the high-speed optical receiver module 14H.

The high-speed optical receiver module 14H receives the optical signal emitted by the high-speed light emitting device 18H having a higher flashing speed than the optical signal emitted by the low-speed light emitting device 18L. In order to enhance the response speed to the flashing speed of the optical signal, the high-speed light receiving device 26H has a smaller light receiving area than the low-speed light receiving device 26L.

Further, because the optical signal emitted by the high-speed light emitting device 18H has larger optical power than the optical signal emitted by the low-speed light emitting device 18L, the magnitude of the current signal converted by the high-speed light receiving device 26H is larger than that of the current signal converted by the low-speed light receiving device 26L. In order to prevent saturation of the voltage signal after being amplified, the high-speed optical receiver module 14H converts and amplifies the current signal outputted from the high-speed light receiving device 26H into a voltage signal by employing the low-gain amplifier 28H having a lower gain than the high-gain amplifier 28L of the low-speed optical receiver module 14L.

Figure 3A:
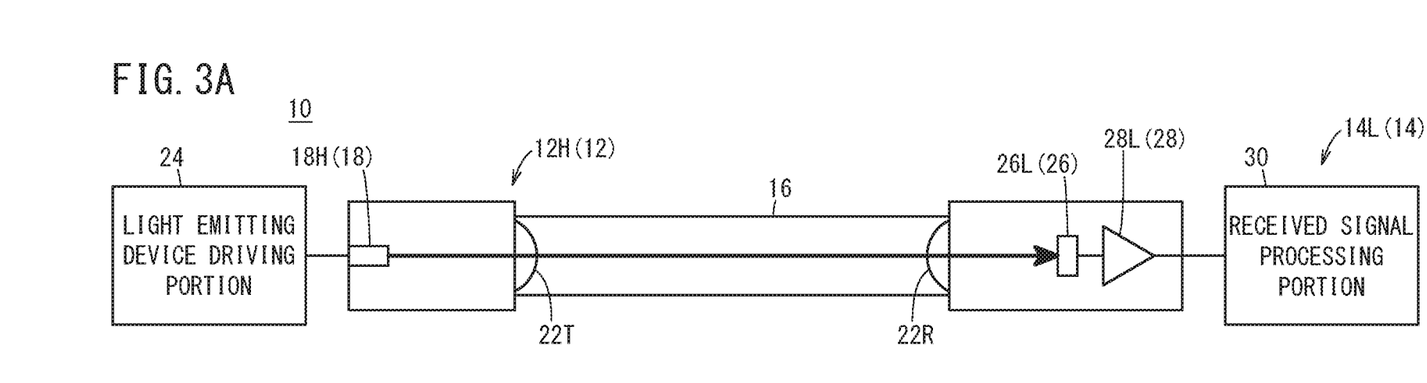
FIG. 3A is a schematic diagram illustrating an optical communication system in which a high-speed optical transmitter module and a low-speed optical receiver module are connected through an optical cable.

FIG. 3A is a schematic diagram illustrating an optical communication system 10 in which the high-speed optical transmitter module 12H and the low-speed optical receiver module 14L are connected through the optical cable 16. The low-speed light receiving device 26L of the low-speed optical receiver module 14L may be unable to follow the flashing speed of the optical signal sent from the high-speed light emitting device 18H and fail to convert the optical signal into a current signal. Further, since the high-gain amplifier 28L of the low-speed optical receiver module 14L has a high gain for the magnitude of the current signal converted from the optical signal of the high-speed light emitting device 18H, the voltage signal after amplified may be saturated and its waveform may be distorted.

Figure 3B:
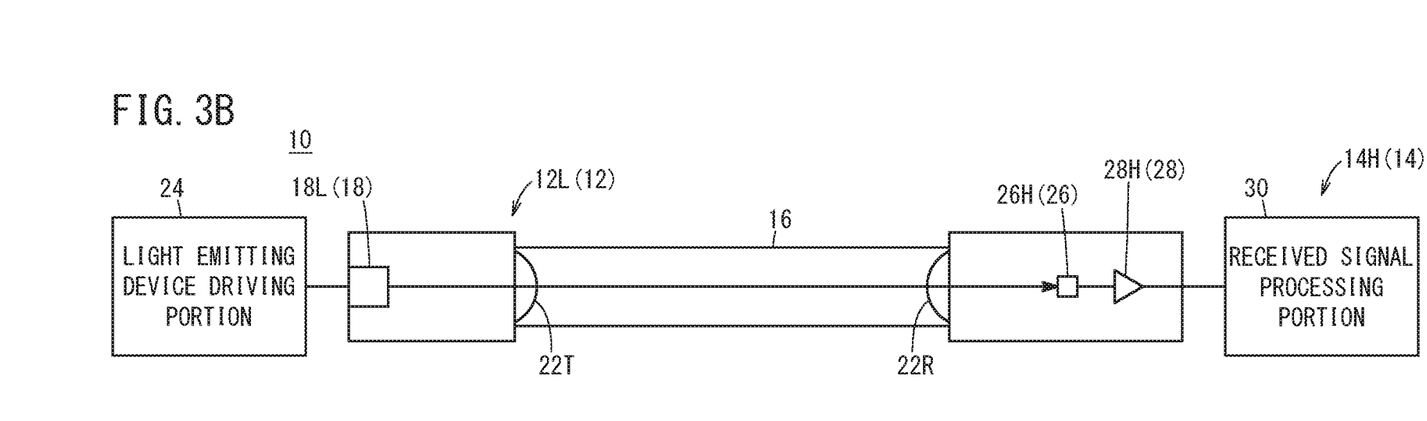
FIG. 3B is a schematic diagram illustrating an optical communication system in which a low-speed optical transmitter module and a high-speed optical receiver module are connected through an optical cable.

FIG. 3B is a schematic diagram illustrating an optical communication system 10 in which the low-speed optical transmitter module 12L and the high-speed optical receiver module 14H are connected through the optical cable 16. The high-speed light receiving device 26H of the high-speed optical receiver module 14H is not sensitive enough for the optical power of the optical signal sent from the low-speed light emitting device 18L and may be unable to convert the optical signal into a current signal. Further, since the low-gain amplifier 28H of the high-speed optical receiver module 14H has a low gain for the magnitude of the current signal converted from the optical signal of the low-speed light emitting device 18L, the low-gain amplifier 28H may be unable to provide a voltage signal that has been amplified to a sufficient magnitude.

The optical transmitter module 12 according to this embodiment includes: the low-speed light emitting device 18L configured to emit an optical signal at a wavelength of 650 nm; the high-speed light emitting device 18H configured to emit an optical signal at a wavelength of 850 nm and capable of operating at a higher speed than the low-speed light emitting device 18L; and the filter 20T configured to transmit one of, and reflect the other of, the optical signal at the wavelength of 650 nm emitted by the low-speed light emitting device 18L and the optical signal at the wavelength of 850 nm emitted by the high-speed light emitting device 18H, so as to transmit the optical signal to the optical receiver module 14.

Thus, the optical transmitter module 12 can emit the optical signal from the low-speed light emitting device 18L when the low-speed optical receiver module 14L is connected, and emit the optical signal from the high-speed light emitting device 18H when the high-speed optical receiver module 14H is connected. Consequently, the optical transmitter module 12 can select and transmit an optical signal that the optical receiver module 14 can convert into a voltage signal.

In the optical transmitter module 12 according to this embodiment, the optical power of the optical signal from the high-speed light emitting device 18H is larger than the optical power of the optical signal from the low-speed light emitting device 18L. Accordingly, the optical transmitter module 12 can transmit the optical signal from the high-speed light emitting device 18H having larger optical power than the optical signal from the low-speed light emitting device 18L to the high-speed optical receiver module 14H having the high-speed light receiving device 26H having lower sensitivity than the low-speed light receiving device 26L, so that the high-speed light receiving device 26H can convert the optical signal into a current signal. Further, it is possible to transmit the optical signal from the low-speed light emitting device 18L having smaller optical power than the optical signal from the high-speed light emitting device 18H to the low-speed optical receiver module 14L having the high-gain amplifier 28L having a higher gain than the low-gain amplifier 28H, so that the low-speed optical receiver module 14L can convert the optical signal into a voltage signal.

The optical transmitter module 12 according to this embodiment includes the light emitting device driving portion 24 configured to cause one of the low-speed light emitting device 18L and the high-speed light emitting device 18H to operate. Accordingly, the optical transmitter module 12 can drive the low-speed light emitting device 18L by the light emitting device driving portion 24 when the low-speed optical receiver module 14L is connected, and drive the high-speed light emitting device 18H by the light emitting device driving portion 24 when the high-speed optical receiver module 14H is connected.

Second Embodiment

While the optical communication system 10 according to the first embodiment is configured in such a manner that the optical transmitter module 12 can transmit both of an optical signal for low-speed communication and an optical signal for high-speed communication, an optical communication system 10 according to a second embodiment is configured in such a manner that the optical receiver module 14 can receive both of an optical signal for low-speed communication and an optical signal for high-speed communication.

Configuration of Optical Communication System

Figure 4A:
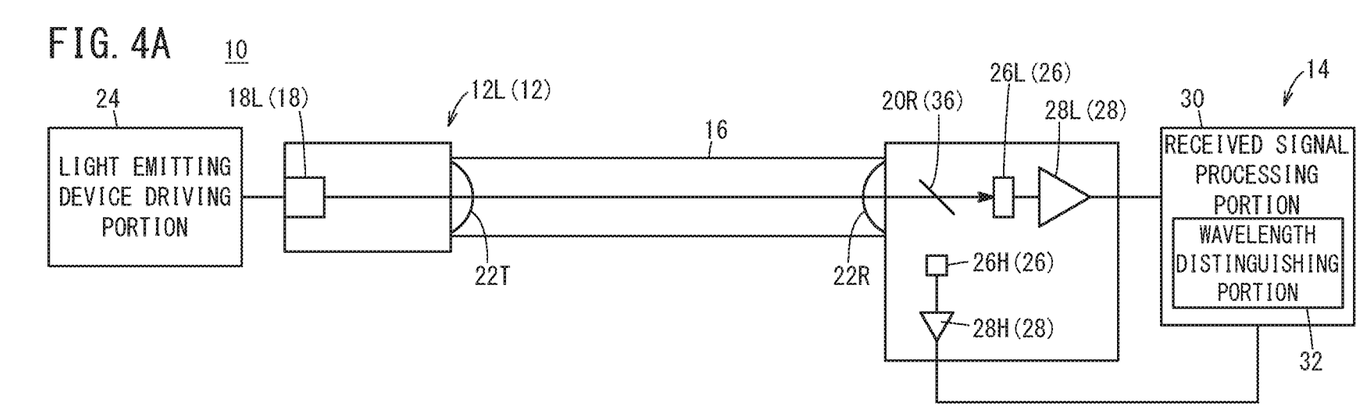
FIGS. 4A and 4B are schematic diagrams each illustrating an optical communication system.
Figure 4B:
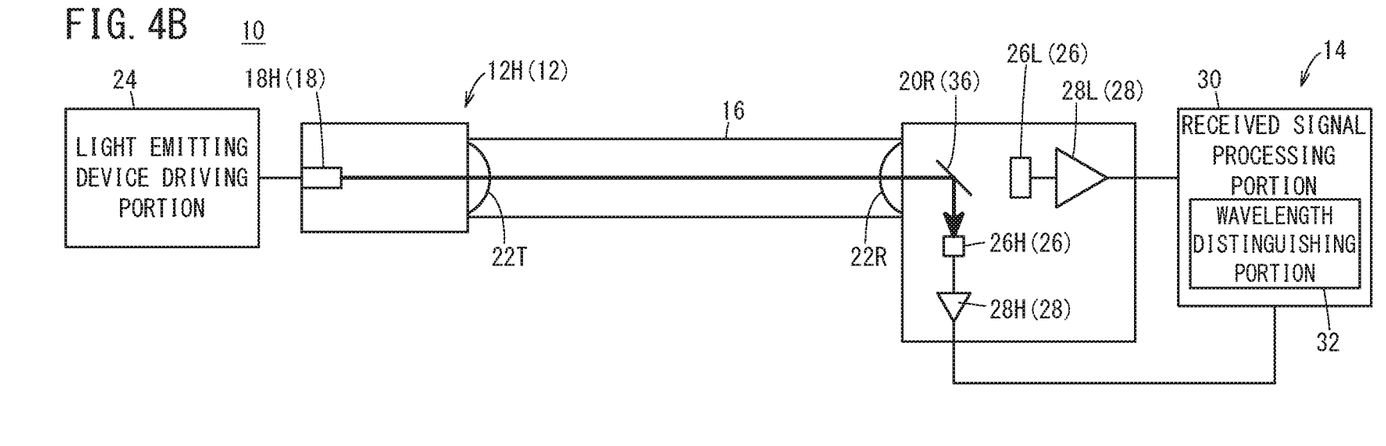

FIGS. 4A and 4B are schematic diagrams each illustrating the optical communication system 10. In the optical communication system 10 according to this embodiment, the optical transmitter module 12 is adapted only to one of low-speed communication and high-speed communication. On the other hand, the optical receiver module 14 is adapted to both of low-speed communication and high-speed communication. The optical transmitter module 12 of the optical communication system 10 shown in FIG. 4A is the low-speed optical transmitter module 12L adapted to low-speed communication. The optical transmitter module 12 of the optical communication system 10 shown in FIG. 4B is the high-speed optical transmitter module 12H adapted to high-speed communication.

The low-speed optical transmitter module 12L (FIG. 4A) includes the low-speed light emitting device 18L, the lens 22T, and the light emitting device driving portion 24. The low-speed light emitting device 18L is composed of an LED. The low-speed light emitting device 18L generates an optical signal by flashing on and off light at a wavelength of 650 nm. The lens 22T causes the optical signal emitted from the low-speed light emitting device 18L to become a parallel beam and outputs it onto the optical cable 16. The light emitting device driving portion 24 drives the low-speed light emitting device 18L to make it emit an optical signal based on an instruction from a control device not shown.

The high-speed optical transmitter module 12H (FIG. 4B) includes the high-speed light emitting device 18H, the lens 22T, and the light emitting device driving portion 24. The high-speed light emitting device 18H is composed of an LD. The high-speed light emitting device 18H generates an optical signal by flashing on and off light at a wavelength of 850 nm. The lens 22T causes the optical signal emitted from the high-speed light emitting device 18H to become a parallel beam and outputs it onto the optical cable 16. The light emitting device driving portion 24 drives the high-speed light emitting device 18H to make it emit an optical signal based on an instruction from a control device not shown.

The optical signal emitted by the high-speed light emitting device 18H has stronger optical power than the optical signal emitted by the low-speed light emitting device 18L, and the high-speed light emitting device 18H has a higher driving speed than the low-speed light emitting device 18L.

The optical receiver module 14 includes the lens 22R, a filter 20R, the low-speed light receiving device 26L, the high-gain amplifier 28L, the high-speed light receiving device 26H, the low-gain amplifier 28H, and the received signal processing portion 30. The lens 22R condenses the optical signal inputted from the optical cable 16. The filter 20R is a beam splitter, which is configured to transmit the optical signal at the wavelength of 650 nm emitted from the low-speed light emitting device 18L of the low-speed optical transmitter module 12L and reflect the optical signal at the wavelength of 850 nm emitted from the high-speed light emitting device 18H of the high-speed optical transmitter module 12H. The filter 20R constitutes a second filter 36.

The low-speed light receiving device 26L is composed of a PD. The low-speed light receiving device 26L generates a current having a magnitude corresponding to the optical power of the received optical signal. That is to say, the low-speed light receiving device 26L converts the optical signal into a current signal. The high-gain amplifier 28L converts and amplifies the current signal outputted by the low-speed light receiving device 26L into a voltage signal.

The high-speed light receiving device 26H is composed of a PD. The high-speed light receiving device 26H generates a current having a magnitude corresponding to the optical power of the received optical signal. That is to say, the high-speed light receiving device 26H converts the optical signal into a current signal. The low-gain amplifier 28H converts and amplifies the current signal outputted by the high-speed light receiving device 26H into a voltage signal.

The low-speed light receiving device 26L has a light receiving area that is formed larger than that of the high-speed light receiving device 26H. The light receiving area of the low-speed light receiving device 26L is set in accordance with the optical power and flashing speed of the optical signal emitted by the low-speed light emitting device 18L, and the light receiving area of the high-speed light receiving device 26H is set in accordance with the optical power and flashing speed of the optical signal emitted by the high-speed light emitting device 18H. Further, the low-gain amplifier 28H of the optical receiver module 14 has a lower gain than the high-gain amplifier 28L. The received signal processing portion 30 converts the voltage signal amplified at the high-gain amplifier 28L, or the voltage signal amplified at the low-gain amplifier 28H, into a digital signal and transmits the digital signal to a control device not shown.

The received signal processing portion 30 includes a wavelength distinguishing portion 32. The wavelength distinguishing portion 32 is configured to determine that the optical signal received at the optical receiver module 14 is the 650-nm optical signal transmitted from the low-speed optical transmitter module 12L when a voltage signal is inputted from the high-gain amplifier 28L. Further, when a voltage signal is inputted from the low-gain amplifier 28H, the wavelength distinguishing portion 32 determines that the optical signal received at the optical receiver module 14 is the 850-nm optical signal transmitted from the high-speed optical transmitter module 12H.

Functions and Effects

The optical receiver module 14 according to this embodiment includes: the filter 20R configured to transmit one of the 650-nm-wavelength optical signal and the 850-nm-wavelength optical signal and reflect the other so as to receive the optical signal; the low-speed light receiving device 26L configured to receive the 650-nm-wavelength optical signal; and the high-speed light receiving device 26H configured to receive the 850-nm-wavelength optical signal and capable of operating at higher speed than the low-speed light receiving device 26L.

In this way, the optical receiver module 14 receives the optical signal at the low-speed light receiving device 26L when the low-speed optical transmitter module 12L is connected, and receives the optical signal at the high-speed light receiving device 26H when the high-speed optical transmitter module 12H is connected. Thus, the optical receiver module 14 can switch the light receiving device 26 receiving the optical signal between the low-speed light receiving device 26L and the high-speed light receiving device 26H in accordance with the optical power and flashing speed of the optical signal transmitted from the optical transmitter module 12, and convert the optical signal into a voltage signal.

The optical receiver module 14 according to this embodiment includes the high-gain amplifier 28L configured to convert and amplify the current signal outputted by the low-speed light receiving device 26L into a voltage signal, and the low-gain amplifier 28H configured to convert and amplify the current signal outputted by the high-speed light receiving device 26H into a voltage signal, where the gain of the high-gain amplifier 28L is higher than the gain of the low-gain amplifier 28H. This makes it possible to obtain a voltage signal having an appropriate magnitude.

The optical receiver module 14 according to this embodiment includes the wavelength distinguishing portion 32 that is configured to identify the wavelength of the optical signal according to which light receiving device 26, between the low-speed light receiving device 26L and the high-speed light receiving device 26H, has received the optical signal. It is thus possible to distinguish whether the optical transmitter module 12 connected to the optical receiver module 14 is the low-speed optical transmitter module 12L or the high-speed optical transmitter module 12H.

Third Embodiment

In a third embodiment, the optical transmitter module 12 is configured to be able to transmit both of optical signals for low-speed communication and optical signals for high-speed communication, and the optical receiver module 14 is configured to be able to receive both of optical signals for low-speed communication and optical signals for high-speed communication.

Configuration of Optical Communication System

Figure 5A:
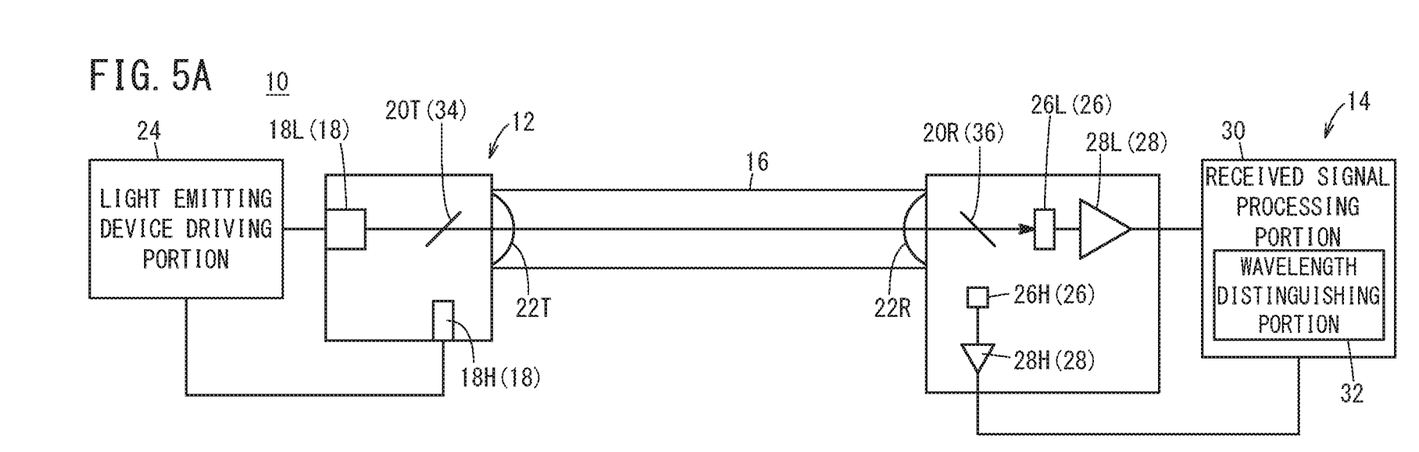
FIGS. 5A and 5B are schematic diagrams each illustrating an optical communication system.
Figure 5B:
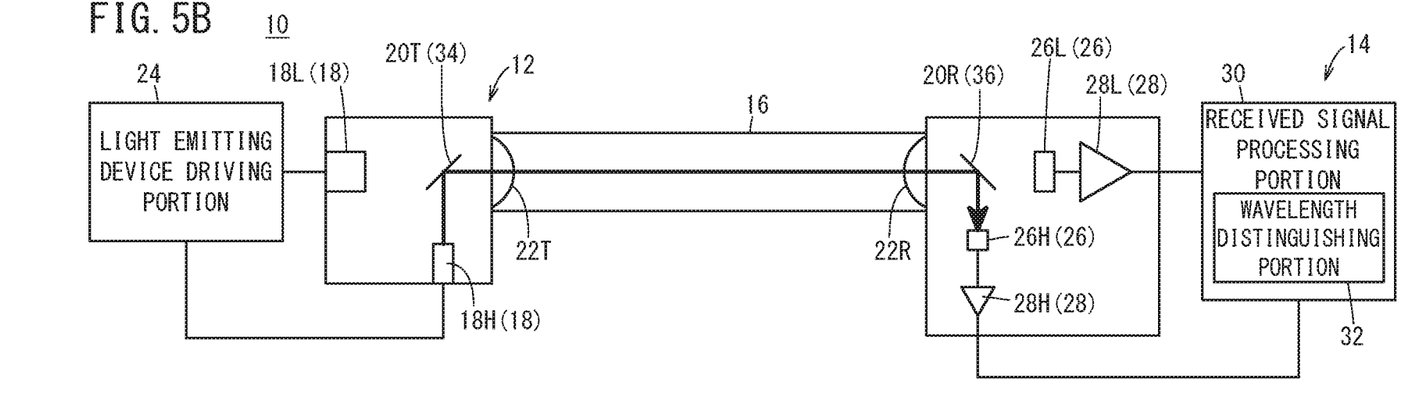

FIGS. 5A and 5B are schematic diagrams illustrating the optical communication system 10. FIG. 5A is a diagram illustrating a state in which an optical signal for low-speed communication has been transmitted from the optical transmitter module 12. FIG. 5B is a diagram illustrating a state in which an optical signal for high-speed communication has been transmitted from the optical transmitter module 12. In the optical communication system 10 of this embodiment, the optical transmitter module 12 is adapted to both of low-speed communication and high-speed communication, and the optical receiver module 14 is adapted to both of low-speed communication and high-speed communication.

The optical transmitter module 12 includes the low-speed light emitting device 18L, the high-speed light emitting device 18H, the filter 20T, the lens 22T, and the light emitting device driving portion 24. The low-speed light emitting device 18L is made of an LED. The low-speed light emitting device 18L generates an optical signal by flashing on and off light at a wavelength of 650 nm. The high-speed light emitting device 18H is made of an LD. The high-speed light emitting device 18H generates an optical signal by flashing on and off light at a wavelength of 850 nm. The optical power of the high-speed light emitting device 18H is stronger than the optical power of the low-speed light emitting device 18L, and the driving speed of the high-speed light emitting device 18H is faster than the driving speed of the low-speed light emitting device 18L.

The filter 20T is configured to transmit the optical signal at the wavelength of 650 nm emitted from the low-speed light emitting device 18L and reflect the optical signal at the wavelength of 850 nm emitted from the high-speed light emitting device 18H. The lens 22T causes the optical signal emitted by the low-speed light emitting device 18L, or the optical signal emitted by the high-speed light emitting device 18H, to become parallel light, and outputs the light onto the optical cable 16.

The light emitting device driving portion 24 drives one or both of the low-speed light emitting device 18L and high-speed light emitting device 18H to cause it or them to emit optical signal(s) based on instructions from a control device not shown. The light emitting device driving portion 24 drives the low-speed light emitting device 18L when low-speed communication is to be performed, and drives the high-speed light emitting device 18H when high-speed communication is to be performed. The light emitting device driving portion 24 may be configured to simultaneously drive both of the low-speed light emitting device 18L and the high-speed light emitting device 18H.

The optical receiver module 14 includes the lens 22R, the filter 20R, the low-speed light receiving device 26L, the high-gain amplifier 28L, the high-speed light receiving device 26H, the low-gain amplifier 28H, and the received signal processing portion 30. The lens 22R condenses the optical signal inputted from the optical cable 16. The filter 20R is configured to transmit the optical signal at the wavelength of 650 nm emitted from the low-speed light emitting device 18L of the optical transmitter module 12 and reflect the optical signal at the wavelength of 850 nm emitted from the high-speed light emitting device 18H of the optical transmitter module 12.

The low-speed light receiving device 26L is made of a PD. The low-speed light receiving device 26L generates a current having a magnitude corresponding to the optical power of the received optical signal. That is to say, the low-speed light receiving device 26L converts the optical signal into a current signal. The high-gain amplifier 28L converts and amplifies the current signal outputted by the low-speed light receiving device 26L into a voltage signal.

The high-speed light receiving device 26H is made of a PD. The high-speed light receiving device 26H generates a current having a magnitude corresponding to the optical power of the received optical signal. That is to say, the high-speed light receiving device 26H converts the optical signal into a current signal. The low-gain amplifier 28H converts and amplifies the current signal outputted by the high-speed light receiving device 26H into a voltage signal.

The low-speed light receiving device 26L has a light receiving area that is formed larger than that of the high-speed light receiving device 26H. The light receiving area of the low-speed light receiving device 26L is set in accordance with the optical power and flashing speed of the optical signal emitted by the low-speed light emitting device 18L, and the light receiving area of the high-speed light receiving device 26H is set in accordance with the optical power and flashing speed of the optical signal emitted by the high-speed light emitting device 18H. Further, the low-gain amplifier 28H of the optical receiver module 14 has a lower gain than the high-gain amplifier 28L.

The received signal processing portion 30 converts the voltage signal amplified at the high-gain amplifier 28L, or the voltage signal amplified at the low-gain amplifier 28H, into a digital signal and transmits the digital signal to a control device not shown.

The received signal processing portion 30 includes the wavelength distinguishing portion 32. The wavelength distinguishing portion 32 is configured to determine that the optical signal received at the optical receiver module 14 is the 650-nm optical signal transmitted from the low-speed light emitting device 18L of the optical transmitter module 12 when a voltage signal is inputted from the high-gain amplifier 28L. Further, when a voltage signal is inputted from the low-gain amplifier 28H, the wavelength distinguishing portion 32 determines that the optical signal received at the optical receiver module 14 is the 850-nm optical signal transmitted from the high-speed light emitting device 18H of the optical transmitter module 12.

Functions and Effects

The optical communication system 10 according to this embodiment includes the optical transmitter module 12 and the optical receiver module 14. The optical transmitter module 12 includes: the low-speed light emitting device 18L configured to emit an optical signal at a wavelength of 650 nm; the high-speed light emitting device 18H configured to emit an optical signal at a wavelength of 850 nm and capable of operating at a higher speed than the low-speed light emitting device 18L; and the filter 20T configured to transmit one of, and reflect the other of, the optical signal at the wavelength of 650 nm emitted by the low-speed light emitting device 18L and the optical signal at the wavelength of 850 nm emitted by the high-speed light emitting device 18H, so as to transmit the optical signal to the optical receiver module 14. The optical receiver module 14 includes: the low-speed light receiving device 26L configured to receive the optical signal at the wavelength of 650 nm; the high-speed light receiving device 26H configured to receive the optical signal at the wavelength of 850 nm and capable of operating at a higher speed than the low-speed light receiving device 26L; and the filter 20R configured to transmit one of, and reflect the other of, the received optical signal at the wavelength of 650 nm and the received optical signal at the wavelength of 850 nm, so as to send the optical signal at the wavelength of 650 nm to the low-speed light receiving device 26L and send the optical signal at the wavelength of 850 nm to the high-speed light receiving device 26H.

Thus, the optical communication system 10 of this embodiment is capable of performing both of low-speed communication and high-speed communication. Furthermore, according to the optical communication system 10 of this embodiment, even when both of the low-speed light emitting device 18L and the high-speed light emitting device 18H are simultaneously driven, the optical signal emitted from the low-speed light emitting device 18L is received at the low-speed light receiving device 26L, and the optical signal emitted from the high-speed light emitting device 18H is received at the high-speed light receiving device 26H. This increases the amounts of communications by the optical communication system 10.

According to the optical communication system 10 of this embodiment, the optical signal of the high-speed light emitting device 18H has larger optical power than the optical signal of the low-speed light emitting device 18L. Hence, in the optical communication system 10, the optical signal of the high-speed light emitting device 18H having larger optical power than the optical signal of the low-speed light emitting device 18L is transmitted to the high-speed light receiving device 26H having lower sensitivity than the low-speed light receiving device 26L, and the optical receiver module 14 can obtain a voltage signal based on the optical signal.

The optical communication system 10 according to this embodiment includes the high-gain amplifier 28L configured to convert and amplify the current signal outputted by the low-speed light receiving device 26L into a voltage signal, and the low-gain amplifier 28H configured to convert and amplify the current signal outputted by the high-speed light receiving device 26H into a voltage signal, where the gain of the high-gain amplifier 28L is higher than the gain of the low-gain amplifier 28H. This makes it possible to obtain a voltage signal having an appropriate magnitude.

The optical communication system 10 according to this embodiment includes the wavelength distinguishing portion 32 that is configured to identify the wavelength of the optical signal according to which light receiving device 26, between the low-speed light receiving device 26L and the high-speed light receiving device 26H, has received the optical signal. The optical communication system 10 can thus know whether the optical transmitter module 12 has emitted the optical signal by driving the low-speed light emitting device 18L or emitted the optical signal by driving the high-speed light emitting device 18H.

Technical Ideas Obtained from Embodiments

Technical ideas that can be grasped from the embodiments above will be described below.

An optical communication system (10) includes an optical transmitter module (12) for performing transmission of an optical signal and an optical receiver module (14) for performing reception of the optical signal. The optical transmitter module (12) includes: a low-speed light emitting device (18L) configured to emit the optical signal at a first given wavelength; a high-speed light emitting device (18H) configured to emit the optical signal at a second given wavelength that is a wavelength different from the first given wavelength, and capable of operating at a higher speed than the low-speed light emitting device (18L); and a first filter (34) configured to transmit one of, and reflect the other of, the optical signal at the first given wavelength emitted by the low-speed light emitting device (18L) and the optical signal at the second given wavelength emitted by the high-speed light emitting device (18H), so as to transmit the optical signal to the optical receiver module (14). The optical receiver module (14) includes: a low-speed light receiving device (26L) configured to receive the optical signal at the first given wavelength; a high-speed light receiving device (26H) configured to receive the optical signal at the second given wavelength and capable of operating at a higher speed than the low-speed light receiving device (26L); and a second filter (36) configured to transmit one of, and reflect the other of, the received optical signal at the first given wavelength and the received optical signal at the second given wavelength, so as to send the optical signal at the first given wavelength to the low-speed light receiving device (26L) and send the optical signal at the second given wavelength to the high-speed light receiving device (26H). Thus, the optical communication system (10) is capable of performing both of low-speed communication and high-speed communication. Furthermore, according to the optical communication system (10), even when both of the low-speed light emitting device (18L) and the high-speed light emitting device (18H) are simultaneously driven, the optical signal emitted from the low-speed light emitting device (18L) is received at the low-speed light receiving device (26L), and the optical signal emitted from the high-speed light emitting device (18H) is received at the high-speed light receiving device (26H). This increases the amounts of communications by the optical communication system (10).

In the optical communication system (10) above, the optical signal of the high-speed light emitting device (18H) may have optical power larger than optical power of the optical signal of the low-speed light emitting device (18L). Thus, in the optical communication system (10), the optical signal of the high-speed light emitting device (18H) having larger optical power than the optical signal of the low-speed light emitting device (18L) is transmitted to the high-speed light receiving device (26H) having lower sensitivity than the low-speed light receiving device (26L), so that the optical receiver module (14) can obtain a voltage signal based on the optical signal.

The optical communication system (10) above may further include a high-gain amplifier (28L) configured to convert and amplify a current outputted by the low-speed light receiving device (26L) into a voltage signal, and a low-gain amplifier (28H) configured to convert and amplify a current outputted by the high-speed light receiving device (26H) into a voltage signal, where the high-gain amplifier (28L) may have a gain higher than a gain of the low-gain amplifier (28H). This makes it possible to obtain a voltage signal having an appropriate magnitude.

The optical communication system (10) above may further include a wavelength distinguishing portion (32) that is configured to identify the wavelength of the optical signal according to which light receiving device, between the low-speed light receiving device (26L) and the high-speed light receiving device (26H), has received the optical signal. The optical communication system (10) can thus distinguish whether the optical transmitter module (12) has emitted the optical signal by driving the low-speed light emitting device (18L) or emitted the optical signal by driving the high-speed light emitting device (18H).

An optical transmitter module (12) for performing transmission of an optical signal includes: a low-speed light emitting device (18L) configured to emit the optical signal at a first given wavelength; a high-speed light emitting device (18H) configured to emit the optical signal at a second given wavelength that is a wavelength different from the first given wavelength, and capable of operating at a higher speed than the low-speed light emitting device (18L); and a first filter (34) configured to transmit one of, and reflect the other of, the optical signal at the first given wavelength emitted by the low-speed light emitting device (18L) and the optical signal at the second given wavelength emitted by the high-speed light emitting device (18H), so as to transmit the optical signal to an optical receiver module (14). Thus, the optical transmitter module (12) can emit the optical signal from the low-speed light emitting device (18L) when a low-speed optical receiver module (14L) is connected, and emit the optical signal from the high-speed light emitting device (18H) when a high-speed optical receiver module (14H) is connected. The optical transmitter module (12) can thus select and transmit an optical signal that the optical receiver module (14) can convert into a voltage signal.

In the optical transmitter module (12) above, the optical signal of the high-speed light emitting device (18H) may have optical power that is larger than optical power of the optical signal of the low-speed light emitting device (18L). Then, the optical transmitter module (12) can transmit the optical signal from the high-speed light emitting device (18H) having larger optical power than the optical signal from the low-speed light emitting device (18L) to the high-speed optical receiver module (14H) having a high-speed light receiving device (26H) having lower sensitivity than a low-speed light receiving device (26L), so that the high-speed light receiving device (26H) can convert the optical signal into a current signal.

The optical transmitter module (12) above may further include a light emitting device driving portion (24) configured to cause one of the low-speed light emitting device (18L) and the high-speed light emitting device (18H) to operate, according to which optical receiver module (14) receives the optical signal. Thus, the optical transmitter module (12) can drive the low-speed light emitting device (18L) by the light emitting device driving portion (24) when the low-speed optical receiver module (14L) is connected, and drive the high-speed light emitting device (18H) by the light emitting device driving portion (24) when the high-speed optical receiver module (14H) is connected.

An optical receiver module (14) for performing reception of an optical signal includes: a low-speed light receiving device (26L) configured to receive the optical signal at a first given wavelength; a high-speed light receiving device (26H) configured to receive the optical signal at a second given wavelength that is a wavelength different from the first given wavelength, and capable of operating at a higher speed than the low-speed light receiving device (26L); and a second filter (36) configured to transmit one of, and reflect the other of, the received optical signal at the first given wavelength and the received optical signal at the second given wavelength, so as to send the optical signal at the first given wavelength to the low-speed light receiving device (26L) and send the optical signal at the second given wavelength to the high-speed light receiving device (26H). In this way, the optical receiver module (14) receives the optical signal at the low-speed light receiving device (26L) when a low-speed optical transmitter module (12L) is connected, and receives the optical signal at the high-speed light receiving device (26H) when a high-speed optical transmitter module (12H) is connected. Thus, the optical receiver module (14) can switch the light receiving device (26) for receiving the optical signal between the low-speed light receiving device (26L) and the high-speed light receiving device (26H) in accordance with the optical power and flashing speed of the optical signal transmitted from the optical transmitter module (12), so as to convert the optical signal into a voltage signal.

The optical receiver module (14) above may further include a high-gain amplifier (28L) configured to convert and amplify a current outputted by the low-speed light receiving device (26L) into a voltage signal, and a low-gain amplifier (28H) configured to convert and amplify a current outputted by the high-speed light receiving device (26H) into a voltage signal, where the high-gain amplifier (28L) may have a gain higher than a gain of the low-gain amplifier (28H). This makes it possible to obtain a voltage signal having an appropriate magnitude.

The optical receiver module (14) above may further include a wavelength distinguishing portion (32) that is configured to identify the wavelength of the optical signal according to which light receiving device, between the low-speed light receiving device (26L) and the high-speed light receiving device (26H), has received the optical signal. It is thus possible to distinguish whether the optical transmitter module (12) connected to the optical receiver module (14) is the low-speed optical transmitter module (12L) or the high-speed optical transmitter module (12H).

Although certain preferred embodiments of the present invention have been shown and described in detail, it should be understood that various changes and modifications may be made therein without departing from the scope of the appended claims.

What is claimed is:

1. An optical communication system comprising,
   an optical transmitter module for performing transmission of an optical signal, and
   an optical receiver module for performing reception of the optical signal, wherein
   the optical transmitter module comprises:
   a low-speed light emitting device configured to emit the optical signal at a first given wavelength;
   a high-speed light emitting device configured to emit the optical signal at a second given wavelength that is a wavelength different from the first given wavelength, and capable of operating at a higher speed than the low-speed light emitting device; and
   a first filter configured to transmit one of, and reflect the other of, the optical signal at the first given wavelength emitted by the low-speed light emitting device and the optical signal at the second given wavelength emitted by the high-speed light emitting device, so as to transmit the optical signal to the optical receiver module, and
   the optical receiver module comprises:
   a low-speed light receiving device configured to receive the optical signal at the first given wavelength;
   a high-speed light receiving device configured to receive the optical signal at the second given wavelength and capable of operating at a higher speed than the low-speed light receiving device; and
   a second filter configured to transmit one of, and reflect the other of, the received optical signal at the first given wavelength and the received optical signal at the second given wavelength, so as to send the optical signal at the first given wavelength to the low-speed light receiving device and send the optical signal at the second given wavelength to the high-speed light receiving device,
   the optical transmitter module further comprises a light emitting device driving portion configured to drive only one of the low-speed light emitting device for low-speed communication and the high-speed light emitting device for high-speed communication at a particular time, wherein the optical signal of the high-speed light emitting device has optical power larger than optical power of the optical signal of the low-speed light emitting device; and
   a wavelength distinguishing portion that is configured to identify the wavelength of the optical signal according to which light receiving device, between the low-speed light receiving device and the high-speed light receiving device, has received the optical signal.

2. The optical communication system according to claim 1, further comprising,
   a high-gain amplifier configured to convert and amplify a current outputted by the low-speed light receiving device into a voltage signal, and
   a low-gain amplifier configured to convert and amplify a current outputted by the high-speed light receiving device into a voltage signal,
   wherein the high-gain amplifier has a gain higher than a gain of the low-gain amplifier.

* * * * *